US000001124H

United States Statutory Invention Registration [19]

[11] Reg. Number: H1124

Rouse et al.

[43] Published: Jan. 5, 1993

[54] PARTICLE SMOKE GENERATOR AND METHOD

[75] Inventors: William G. Rouse, Aberdeen; Daniel K. Yu, University Park, both of Md.; Christian S. Gardner, Glendale, Ariz.

[73] Assignee: The United States of America as represented by the Secretary of the Army, Washington, D.C.

[21] Appl. No.: 924,694

[22] Filed: Jul. 30, 1992

Related U.S. Application Data

[63] Continuation of Ser. No. 765,214, Sep. 20, 1991, abandoned.

[51] Int. Cl.[5] ..... F02C 3/00; F42B 12/48

[52] U.S. Cl. ..... 60/39.75; 102/334

*Primary Examiner*—Harold J. Tudor

*Attorney, Agent, or Firm*—Anthony T. Lane; Edward Goldberg; Michael Sachs

[57] ABSTRACT

A particle smoke generator having a gas turbine for combusting air and fuel, and for discharging heated exhaust combustion gases. A venturi tube conveys the heated exhaust gases into a low-pressure region away from the combustion means. A supply of particulate smoke material is joined to a supply tube for conducting the particulate smoke material from the supply to the venturi tube. In the venturi tube the particulate smoke material is deagglomerated by the exhaust gases. The deagglomerated particles and gases are diffused in a diffuser nozzle to generate smoke in the atmosphere.

13 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PARTICLE SMOKE GENERATOR AND METHOD

The invention described herein may be manufactured, used and licensed by or for the Government for governmental purposes without the payment to us of any royalties thereon.

This application is a continuation of application Ser. No. 07/765,214, filed Sep. 20, 1991, now abandoned.

BACKGROUND OF THE INVENTION

1. Field of the Invention

The present invention relates to particle smoke generators and methods of generating particle smoke. More particularly, it relates to a gas turbine exhaust apparatus and a method for disseminating particulates and fibers into the atmosphere to form an obscurant such as a smoke screen.

2. Description of the Prior Art

There are many applications, particularly in the military, wherein it is necessary to generate in the atmosphere an obscurant such as a smoke screen or the like. A prior art smoke generator that employs liquid smoke material, such as fog oil, is disclosed in U.S. Statutory Invention Registration Reg. Number: H765, published Apr. 3, 1990. Conventional particulate smoke generators normally create obscurants by dispersing appropriate quantities of particulate materials, such as EA5763 and EA5768, into the atmosphere to generate smoke.

More specifically, prior art particle smoke generators typically include a small gas turbine having a compressor for drawing fresh air into a combustion chamber where fuel is burned. Also included is a bladed rotor that is rotated by the expanding combustion gases. Such turbines, under normal operating conditions, can discharge a high volume of high-velocity exhaust gases at a temperature of about 500 degrees Fahrenheit. However, such exhaust gases are not directly capable themselves of dispersing a sufficient number of particles into the atmosphere to create an acceptable obscurant. In order to disperse the required density of particles to form an obscurant, modifications to existing turbine systems are often necessary.

Such modified prior art turbine systems usually include a means to bleed off some of the compressor air with a control valve and direct it into an ejector. A low-pressure region is created by the ejector. Particles are transported into the low-pressure region where they are injected into the atmosphere in low volumes via a high-velocity air stream. In some cases the high-velocity air stream is also directed toward the exhaust gases to provide additional particle dispersion and buoyancy.

One of the most critical problems confronting designers of particle smoke generators has been developing the various modifications necessary to convert the many different types of available turbines. Although there are a number of different types of gas turbines commercially available and although the military inventory includes yet a further variety of such turbines, most of these devices do not include a bleed-control valve to provide the required low-pressure region. In most cases, complicated gas-turbine modifications are required to install such control valves and other associated control components. Also, due to the design integrity of many turbines, such modifications are often difficult to perform, because implementing such modifications would cause the overall performance of the turbine to be compromised.

Although there has been a long-recognized need for a convenient and reliable means of converting different types of conventional gas turbines into particle smoke generators, no practical system for doing so has yet been devised. The present invention fulfills this need.

SUMMARY OF THE INVENTION

The general purpose of this invention is to provide a particle smoke generator which embraces all the advantages of similarly employed devices and possesses none of the aforedescribed disadvantages. To attain this, the present invention contemplates the following: a particle smoke generator having a combustion device for combusting air and fuel, and for discharging heated exhaust combustion gases; a supply of particulate smoke material; an exhaust for conveying the heated exhaust gases along a low-pressure region away from the combustion device; and a supply tube for conducting the particulate smoke material from the supply to the exhaust for deagglomeration of the particulate smoke material by the exhaust gases.

More specifically, the present invention includes a smoke generator having a gas turbine with a combustion chamber, a compressor means for drawing air into the combustion chamber, a fuel inlet means for admitting fuel into the combustion chamber in the presence of air, a bladed rotor turnable by the heated exhaust gases, and an exhaust outlet means for discharging the heated exhaust gases leaving the rotor. A venturi tube is mounted at the exhaust outlet. The venturi tube includes a hollow tube having an inlet portion in communication with the exhaust outlet means, a narrow throat in communication with the inlet portion, and a diffuser nozzle in communication with the throat. A supply of particulate smoke material includes a supply tube with an outlet end located at the throat of the venturi tube. The exhaust gases drop in static pressure and increase in velocity as they pass through the venturi tube. As such, particles are drawn from the supply tube for deagglomeration by the hot exhaust gases. A diffuser nozzle at the end of the venturi tube diffuses the particles and exhaust gases into the atmosphere as smoke. The diffuser nozzle includes a cooling means in the form of perforations that permit cool air to be drawn into the diffuser nozzle.

The invention is also directed to a method of making smoke involving the following steps: combusting air and fuel to discharge heated exhaust combustion gases; conveying the heated exhaust gases along a path through a low-pressure region; conducting particulate smoke material to the low-pressure region for deagglomeration of the particulate smoke material by the heated exhaust gases; and diffusing the particulate smoke material and gases into the atmosphere. The diffusing step may include cooling the deagglomerated particles by drawing cool air into the low-pressure region.

The exact nature of this invention, as well as other objects and advantages thereof, will be readily apparent from consideration of the following specification relating to the annexed drawings.

DETAILED DESCRIPTION OF THE PREFERRED EMBODIMENT

Figure 1:
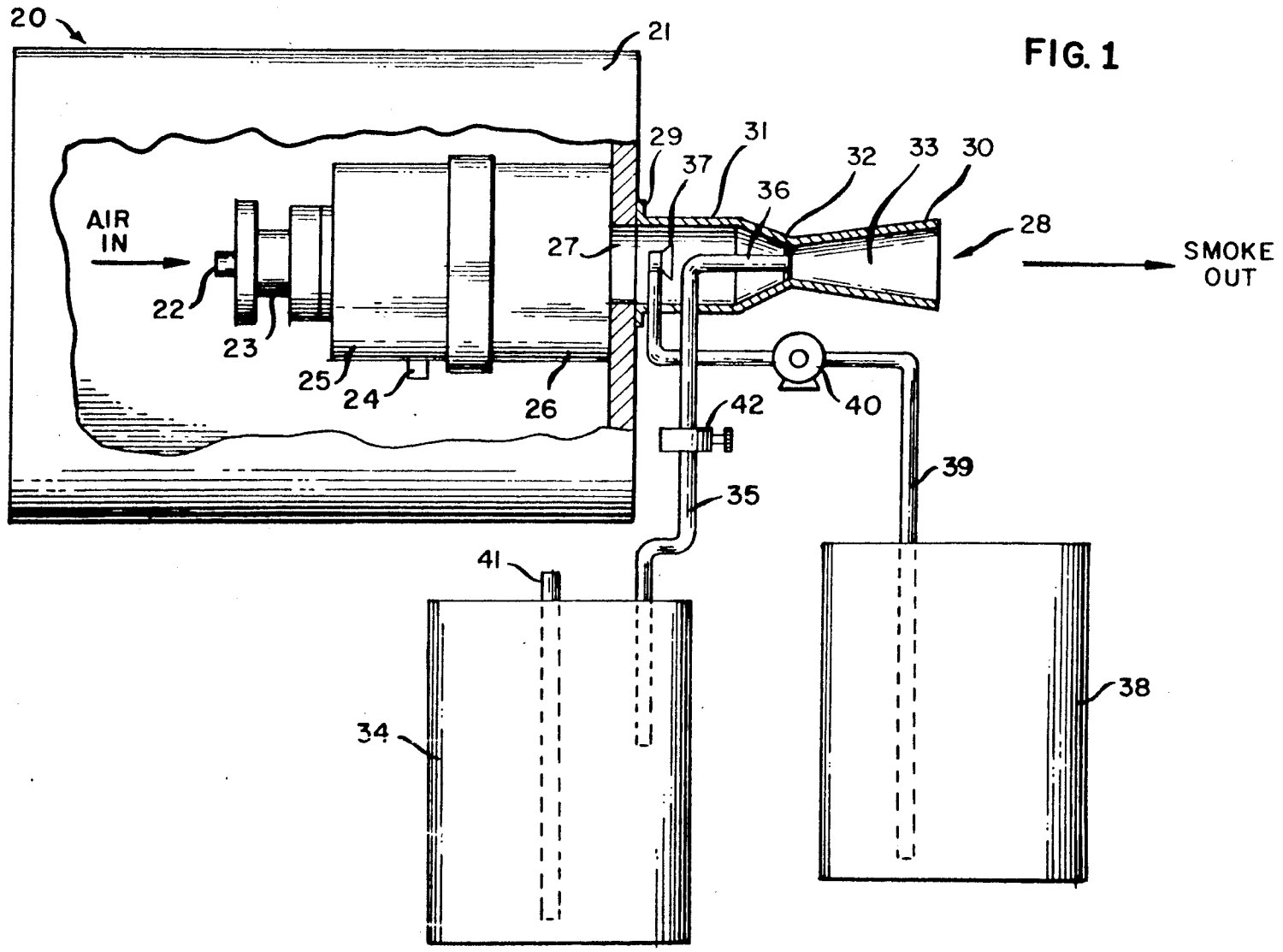
FIG. 1 is a broken-away, partly sectioned side view of a smoke generator according to this invention.

Referring now to the drawings, there is shown in FIG. 1 a smoke generator formed from a conventional gas turbine 20 and a smoke vaporizing and dispensing unit 28. Turbine 20 19 has a housing 21, an air inlet 22, a compressor stage 23 operative for drawing fresh air into the turbine 20, a fuel inlet 24 for admitting liquid fuel, a combustion chamber 25 for burning the liquid fuel in the presence of the compressed air, and a bladed rotor stage 26 which is rotated by the heated exhaust gases emerging from the combustion chamber 25. The heated exhaust gases are discharged from the turbine 20 via exhaust discharge outlet 27. Prior to such discharge, the heated exhaust gases may be conducted to a non-illustrated heat exchanger which is in a heat exchanging relationship with the compressed air emerging from the compressor stage 23 in order to pre-heat the air entering the combustion chamber 25. The rotor stage 26 and the compressor stage 23 may share a common shaft (not shown) which, in turn, is operatively connected to a conventional, non-illustrated starter motor and generator set.

The gas turbine 20 is entirely conventional and requires no extended discussion. One conventional gas turbine having the necessary exhaust characteristics to practice the present invention is the U.S. Air Force Model No. EMU-12. The EMU-12 typically discharges high volumes of high-velocity heated exhaust gases (via outlet 27) at a temperature of about 500°-1000° F.

The smoke vaporizing and dispensing unit 28 is fixed to the housing 21 via a flange 29. Unit 28 includes a venturi tube 30 having a tubular inlet section 31 that is located in direct communication with the exhaust discharge outlet 27 of turbine 20. The venturi tube 30 has a narrow throat 32 and a tapered outlet diffuser nozzle 33.

A particle feeder 34, containing a supply of conventional smoke-producing particulate material, has a supply line 35 with an outlet end 36 that is mounted coaxial with the venturi tube 30 at the throat 32. A ball valve 42 is mounted in supply line 35 for controlling the flow of particulate material to outlet end 36. The feeder 34 is vented to the atmosphere via vent tube 41. A liquid spray nozzle 37 is mounted coaxial with the venturi tube 30 in the inlet section 31. Nozzle 37 is in communication with a supply container 38 via a supply line 39 having a pump 40 located therein. Container 38 houses a supply of conventional liquid smoke material.

Operation of the generator may begin by turning the turbine 20 on while the valve 42 is closed and the pump 40 is off. A high-volume, high-velocity gas stream will be exhausted from the turbine 20 via outlet 27. The turbine exhaust will become very hot (typically about 500°-1000° F.) and will expand through the venturi tube 30. In the steady state, the heated exhaust gases will flow from the inlet section 31 into the throat 32 where they will undergo a substantial increase in velocity and a corresponding drop in static pressure. The venturi tube 30 is designed to cause the gas pressure at the throat 32 to drop below atmospheric pressure, i.e., below the pressure at vent 41. Finally, the exhaust gases will expand into the atmosphere via the diffuser nozzle 33.

After the initial steady state operation is reached, particulate smoke may be generated by opening the valve 42. This action will cause particulate material to be conveyed through the tube 35 into the low-pressure, high-velocity, high-temperature gas stream at the throat 32 where deagglomeration of the particulate material will occur. Finally, the high-volume gas stream of deagglomerated particles is dispersed into the atmosphere via the diffuser nozzle 33 as particulate smoke.

In addition to the particulate smoke, vaporized fog may also be generated by injecting liquid smoke material into the heated exhaust gases via the liquid spray nozzle 37. This action is initiated by energizing the pump 40 in line 39. The pump 40 will draw liquid smoke material from the container 38 and convey it to the nozzle 37 where it will be vaporized by the exhaust gases as it is injected into the section 31. The smoke vaporizing and dispensing unit 28 may be used to produce particulate and liquid smoke simultaneously or either one individually.

Figure 2:
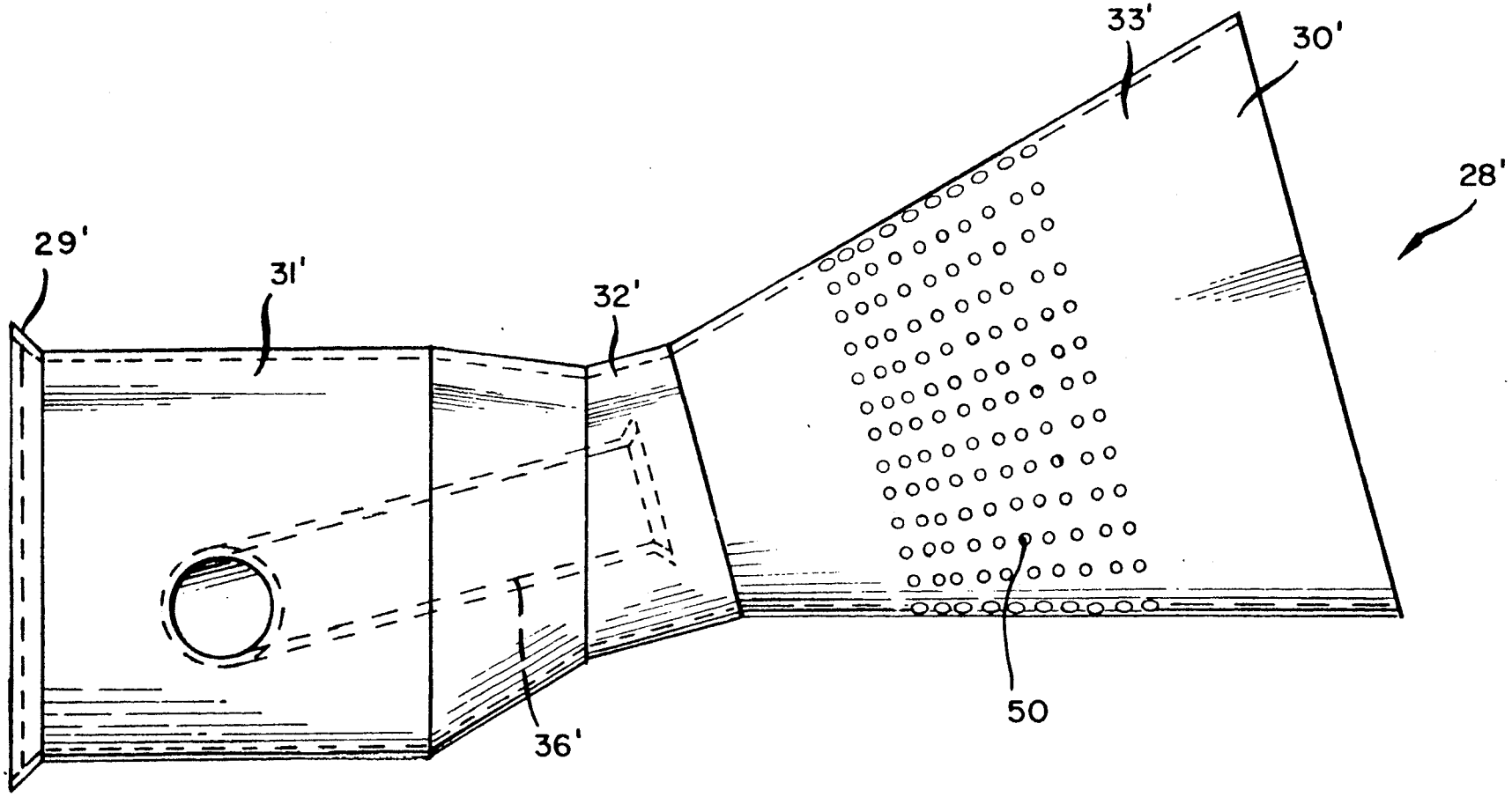
FIG. 2 is a side view of a modification of a portion of the invention.

While the FIG. 1 embodiment will operate adequately to produce smoke under most operating conditions, operation can be adversely affected by certain particulate materials that, when charred by the intense heat of the exhaust, may be deposited on the inside surface of diffuser nozzle 33. FIG. 2 illustrates a modified smoke vaporizing and dispensing unit 28' designed to prevent the deposition of charred smoke particles on the inside surface of unit 28'.

Unit 28' includes a flange 29' for use in fixing the unit 28' to the housing 21 of FIG. 1. Also included is a venturi tube 30' having a tubular inlet section 31'. The venturi tube 30' has a narrow throat 32' and a tapered outlet diffuser nozzle 33'. The central axis of the nozzle 33' is shown at an angle with respect to the central axis of the section 31'. As such, the unit 28' may be mounted on the housing 21 in a position to direct the smoke upward, downward or to either of the sides. The outlet end 36' of a supply tube passes through the wall of section 31' and extends into the throat 32'. The diffuser nozzle 33' includes a plurality of perforations 50 in the wall thereof to act as a cooling means.

As the high-velocity gases, with the deagglomerated smoke particles suspended therein, pass by the perforations 50, cool atmospheric air will be drawn into the diffuser nozzle 33'. This action will result in a cooling of the walls of the diffuser nozzle 33' and a cooling of the deagglomerated particles. Also, the cool atmospheric air will also act as a protective boundary layer between the inside surface of diffuser nozzle 33' and the hot smoke. Because of the cooling and boundary-layer effect, the deposition of charred particles on the diffuser nozzle 33' is prevented.

Obviously, many other modifications, variations and applications of the present invention are possible in the light of the above teachings. The foregoing disclosure and drawings are merely illustrative of the principles of this invention and are not to be interpreted in a limiting sense. It is to be understood that the invention should not be limited to the exact details of construction shown and described because obvious modifications will occur to a person skilled in the art.

What is claimed is:

1. A particle smoke generator comprising:

combustion means for combusting air and fuel, and for discharging heated exhaust combustion gases;

a supply of particulate smoke material;

exhaust means for conveying the heated exhaust gases along a low-pressure region away from the combustion means; and means for conducting the particulate smoke material from said supply to said exhaust means for deagglomeration of said particulate smoke material by said exhaust gases.

2. The smoke generator of claim 1 wherein said combustion means is a gas turbine having an exhaust outlet means for discharging said heated exhaust gases into said exhaust means.

3. The smoke generator of claim 2 wherein said exhaust means includes a venturi tube.

4. The smoke generator of claim 3 wherein said venturi tube includes a hollow tube having an inlet portion in communication with said exhaust outlet means, a narrow throat in communication with said inlet portion, and a diffuser nozzle in communication with said throat.

5. The smoke generator of claim 4 wherein said means for conducting the particulate smoke material includes an outlet orifice mounted in said venturi tube at said throat.

6. The smoke generator of claim 5 wherein said diffuser nozzle is mounted at an angle with respect to said exhaust outlet means.

7. The smoke generator of claim 5 wherein said diffuser nozzle includes temperature control means for cooling said exhaust gases.

8. The smoke generator of claim 7 wherein said temperature control means includes means for drawing cool atmospheric air into said nozzle.

9. The smoke generator of claim 8 wherein said diffuser nozzle includes tapered walls extending from said throat and said temperature control means includes perforations formed in said tapered walls adjacent said throat.

10. The smoke generator of claim 4 further including a supply of liquid smoke material and means for conducting said liquid smoke material to said inlet portion.

11. A method of generating smoke comprising the steps of:

combusting air and fuel to discharge heated exhaust combustion gases;

conveying the heated exhaust gases along a path through a low-pressure region;

conducting particulate smoke material to the low-pressure region for deagglomeration of said particulate smoke material by said heated exhaust gases; and diffusing the particulate smoke material and gases into the atmosphere.

12. The method of claim 11 wherein said diffusing step includes cooling said deagglomerated particles.

13. The method of claim 12 wherein said cooling step includes drawing cool air into said low-pressure region.

* * * * *